Patented May 7, 1946

2,400,045

UNITED STATES PATENT OFFICE 2,400,045

HYDROXY-PYRIDINE DERIVATIVES

Max Hoffer, Montclair, N. J., assignor to Hoffmann-La Roche Inc., Nutley, N. J., a corporation of New Jersey No Drawing. Application August 30, 1941, Serial No. 409,099. In Switzerland August 30, 1940

1 Claim. (Cl. 260—295.5)

My invention relates to derivatives of hydroxypyridine and to a process for making them. In general, these derivatives respond to the formula:

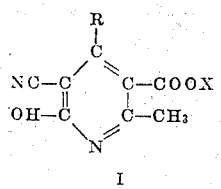

I wherein R represents an organic radical selected from the group consisting of aliphatic saturated hydrocarbon radicals, aromatic radicals, saturated aromatic-aliphatic radicals, and saturated cycloaliphatic radicals.

Specific examples of aliphatic saturated hydrocarbon radicals of this type are methyl, ethyl, propyl, and homologues thereof. The aromatic radicals may be phenyl, alpha and beta naphthyl and other radicals of condensed aromatic hydrocarbon ring systems and their homologues. Saturated aromatic-aliphatic radicals may be benzyl, phenylethyl, as well as their homologues, while saturated cycloaliphatic radicals may be cyclopentyl and cyclohexyl and their homologues and analogues.

Any one of the aforementioned radicals may also contain substituents, such as halogen, a free or substituted hydroxy group, a nitro group, carboxylic group and other radicals provided that the substituents do not themselves undergo any changes under the reaction conditions.

Those compounds are of special interest in which the radical R represents a hydroxymethyl group —CH$_2$·O·R' etherified by a radical R'. wherein R' also stands for an aliphatic, aromatic or alycyclic radical, such as, for instance, a saturated aliphatic radical, such as, methyl, ethyl, propyl, butyl and its isomers or homologues, or an aromatic radical, such as, phenyl, alpha and beta naphthyl and other radicals of condensed ring systems, and radicals composed of an aliphatic and an aromatic radical, such as, benzyl, phenylethyl, naphthylmethyl, and homologues of these radicals.

X in Formula I represents hydrogen or a lower alkyl group (such as methyl or ethyl), or benzyl.

It is an object of my invention to prepare hydroxypyridine derivatives of this type from dihydropyridones of the general formula:

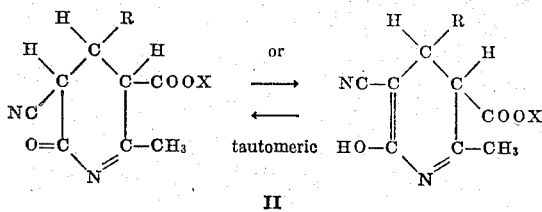

II

In this formula R and X denote the above mentioned radicals. It is, of course, essential that these radicals be such which do not undergo any changes under the reaction conditions.

It is a further object of my invention to prepare the new compounds by dehydrogenation of the dihydropyridones, by means of dehydrogenating agents.

I have described these dihydropyridones employed as initial materials and a method of making them in my copending application S. N. 379,547, filed February 8, 1941, now Patent No. 2,334,490, according to which strong acids are reacted upon nitriles or amides of 2-cyano-3-aryl-, -alkyl-, or aralkyl-4-acetyl-glutaric acid esters in the presence or absence of a solvent, excluding water. These materials are excellently crystallized products of slightly acid character, as shown by their solubility in diluted aqueous sodium- or potassium hydroxide solutions from which they are precipitated unchanged by neutralizing the solutions. They are less soluble or not at all soluble in aqueous ammonia.

I find that the problem of dehydrogenating my dihydropyridones into the corresponding hydroxypyridines is a novel one not dealt with at all by the prior art, and for various reasons it was not to be expected that this conversion could be accomplished.

It is known to dehydrogenate derivatives of dihydropyridines into derivatives of pyridine, but the possibility of this conversion is conditioned upon the presence of substituents in the pyridine nucleus. From the known facts no generally applicable rule is derivable as to the nature and place of the substituents in the nucleus which would be prerequisite to successful dehydrogenation of the untried dihydropyridones which are tautomeric with dehydro-hydroxy pyridines, as shown in Formula II above.

Thus, it has been vainly attempted to dehydrogenate 4'-chloro-dihydrocollidine dicarboxylic acid nitrile into the corresponding pyridine derivative. Instead of a dehydrogenating attack upon the pyridine nucleus, there occurs an exchange of the chloratom with the sodium nitrite employed as dehydrogenating agent, resulting in the oxime of the 4'-aldehydo-dihydrocollidine dicarbonic acid nitrile. On the other hand, it is easily possible to dehydrogenate 4'-chloro-2,6-diphenyl-4-methyl-dihydropyridine dicarboxylic acid nitrile into a pyridine derivative. (Berichte 55, page 3430, 1922). The two initial materials are distinguished merely in that the 2- and 6- positions in the former are substituted by methyl groups, but in the latter by phenyl radicals. It is apparent that dehydrogenation in these cases is dependent upon the nature of the substituents, but the reason for the difference is not explainable.

Again, in the case of dihydrocollidine and of dihydrocollidine dicarboxylicacid ester it was found that the first named compound cannot be dehydrogenated, while the ester is very easily susceptible to dehydrogenation by the action of nitrous gases. (Annalen 125, page 21, 1882; Ber. 16, 1607, 1883; 24, 1668, 1891). The two initial compounds merely differ in that the 3 and 5 positions on the nucleus in dihydrocollidine are substituted by carbethoxy groups, while they are unsubstituted or are carrying hydrogen respectively in the ester. Here also, the presence of substituents of a definite character is primarily responsible for the possibility of dehydrogenation.

But quite apart from the fact that no rule is derivable from prior knowledge as to the type of substituent and its place on the nucleus by which the dehydrogenation of a dihydropyridone derivative into a pyridine derivative might be favored, I am confronted in my invention with a particular species of a substituted dihydropyridine nucleus not heretofore subjected to dehydrogenation at all. This species is characterized in that it possesses an oxygen atom, or a hydroxy radical respectively, in 6-position on the pyridine nucleus, as shown by the above Formula II. The prior art is bare of any suggestions as to whether dihydropyridones of this type might be dehydrogenatable and which dehydrogenating agents would be operative. These dihydropyridine derivatives of Formula II differ from the dihydropyridine derivatives hitherto found capable of undergoing dehydrogenation by the fact that they contain an oxo group or a hydroxy group which cause a substantial change in the chemical character of the compounds as compared with the previously dehydrogenated dihydropyridine derivatives. Although similar representatives of dihydropyridines were known, the dehydrogenation thereof has, in fact, not been carried out before.

I have now found that the dihydropyridines defined in my above Formula II can be dehydrogenated into 6-hydroxy pyridine derivatives by means of a great variety of dehydrogenating agents. I have discovered that all materials capable of binding hydrogen are suitable, provided that they do not act upon the molecule of the initial material in a manner other than by dehydrogenation. As such agents, there come into question sulphur or sulphur compounds such as thionylchloride; also nitric acid or nitrous acid as well as other dehydrogenating nitrogen-oxygen compounds and their derivatives, such as the esters of nitrous acid, and ferricyanide.

Since my discovery is broadly new, a wide range of dehydrogenating agents and of reaction conditions is covered thereby which is limited only by the stability of the initial materials and end products upon exposure to these determinants of the reaction. I have found it to be preferable to perform the reaction in indifferent solvents and at comparatively low temperatures at from 0 to 100° C.

As an indifferent solvent there may be used water, diluted ammonia or an aqueous solution of an alkali, such as sodium or potassium hydroxide, especially when using ferricyanide as dehydrogenating agent, alcohols, such as, methyl alcohol, ethyl alcohol and their homologues, acids, such as, acetic acid and homologues, especially when using derivatives of nitrous acid as dehydrogenating agents, pyridine, quinoline, especially when using sulphur as dehydrogenating agent, or halogenated hydrocarbons, such as tetrachloromethane, chloroform, chlorinated ethanes, or mono chlorbenzene and others when using, for instance, thionylchloride as a dehydrogenating agent.

My method can be used for the manufacture of a great variety of hydroxy pyridines. Thus, 2-methyl-3-carbalkoxy-4-hydroxy-methyl-5-cyano-6-hydroxy pyridines may be obtained from the corresponding dihydro pyridones. The hydroxy-methyl group in position 4 may be substituted by alkyl or aryl radicals, phenoxy-methyl being one of the most useful substituents. The preparation of 2-methyl-3-carbethoxy-4-phenoxymethyl-5-cyano-6-hydroxypyridine by my new method is of particular interest.

*Example 1*

20 parts by weight of 2-methyl-3-carbethoxy-4-phenyl-5-cyanodihydropyridone-6 are heated with 50 parts by volume of thionyl-chloride under reflux with exclusion of atmospheric moisture until dissolved. The reaction mixture is poured into ice-water and, after addition of ether, sucked off for the purpose of taking up tarry by-products. 2-methyl-3-carbethoxy-4-phenyl-5-cyano-6-hydroxy-pyridine is obtained in a yield of 70 per cent of the theoretical. Melting point 238° C.

*Example 2*

30 parts by weight of 2-methyl-3-carbethoxy-4-p-nitrophenyl-5-cyano-dihydropyridone-6 are dissolved in 200 parts by volume of alcohol by heating and 15 parts by weight of amyl-nitrite added. The product is treated with 10 parts by volume of about 8-n-alcoholic hydrogen chloride and heated to 50–60° C. for 10 minutes. On cooling, 2-methyl-3-carbethoxy-4-p-nitrophenyl-5-cyano-6-hydroxy-pyridine crystallizes out in slightly yellowish prisms of melting point 232° C.

*Example 3*

50 parts by weight of 2-methyl-3-carbethoxy-4-phenoxy-methyl-5-cyano-dihydropyridone-6 are finely powdered and suspended in 200 parts by volume of 25 per cent aqueous ammonia. A solution of 125 parts by weight of potassium-ferricyanide is then allowed to flow in at 30° C. while stirring. After stirring for about one hour the dihydro-pyridone has completely dissolved. The product is acidified with acetic acid whereby 2-methyl-3-carbethoxy-4-phenoxymethyl-5-cyano-6-hydroxy-pyridine separates, quickly becoming crystalline. It is purified by recrystallization from much alcohol. The yield is 87–90 per cent of the theoretical. The melting point is 186° C.

By saponification of the ester by warming with a little more than 2 mols of aqueous potassium hydroxide, the free 2-methyl-4-phenoxymethyl-5-cyano-6-hydroxy-pyridine-3-carboxylic acid is obtained. From the reaction solution a little unsaponified ester is first removed by the addition of acetic acid and the acid then precipitated by means of mineral acid. The melting point lies at 260° C. (decomp.).

What I claim is:

2-methyl-3-carbethoxy-4-phenoxymethyl-5-cyano-6-hydroxy pyridine.

MAX HOFFER.